Nov. 12, 1935.   G. F. SPALDING   2,020,859
COFFEEPOT
Filed April 13, 1934   2 Sheets-Sheet 1

INVENTOR
George F. Spalding
BY J. Stanley Churchill.
ATTORNEY

Nov. 12, 1935.    G. F. SPALDING    2,020,859
COFFEEPOT
Filed April 13, 1934    2 Sheets-Sheet 2
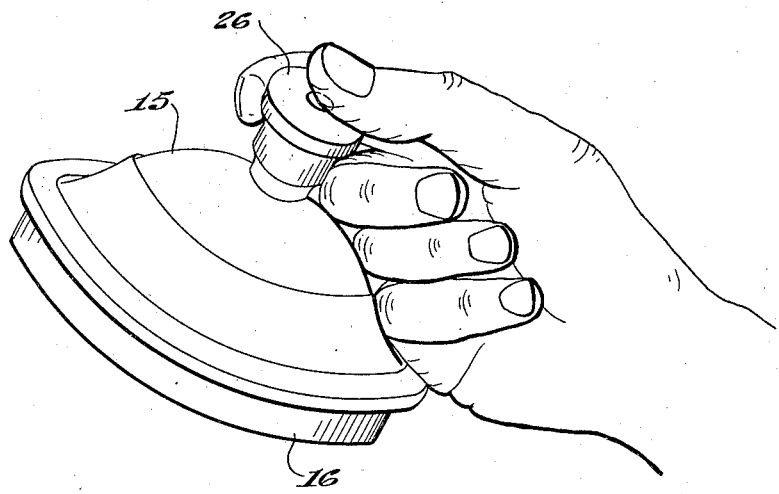
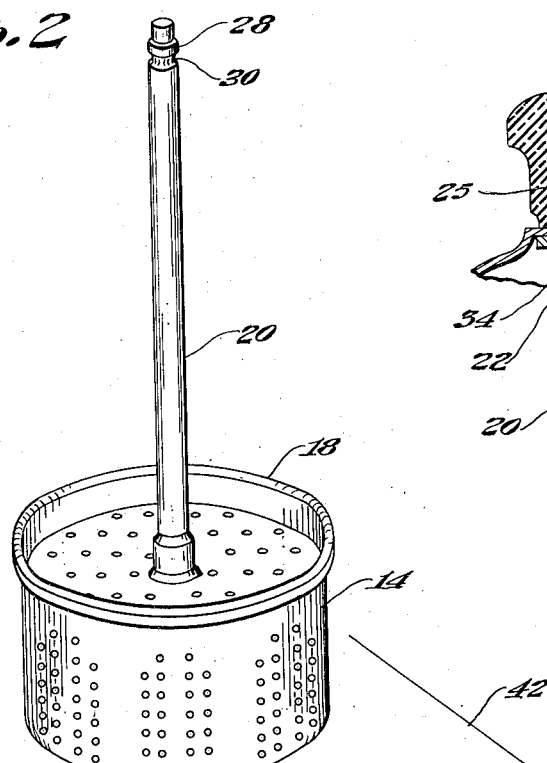
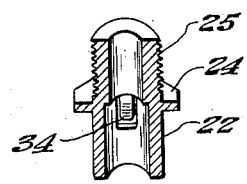
INVENTOR
George F. Spalding
BY J. Stanley Churchill.
ATTORNEY Patented Nov. 12, 1935

2,020,859

UNITED STATES PATENT OFFICE 2,020,859

COFFEEPOT

George F. Spalding, Newton, Mass.

Application April 13, 1934, Serial No. 720,345

4 Claims. (Cl. 53—3)

This invention relates to a coffee pot.

The invention has for an object to provide a novel and improved apparatus with which coffee may be made in a superior, economical and rapid manner, and from which the coffee grounds may be separated from the extraction and conveniently and quickly removed from the pot to avoid dripping from the coffee grounds into the coffee liquor, and thereby avoiding the bitter taste which would otherwise be imparted to the coffee.

With this general object in view and such others as may hereinafter appear, the invention consists in the apparatus for making coffee and in the various structures, arrangements, and combinations of parts hereinafter described and particularly defined in the claims at the end of this specification.

Figure 4A:
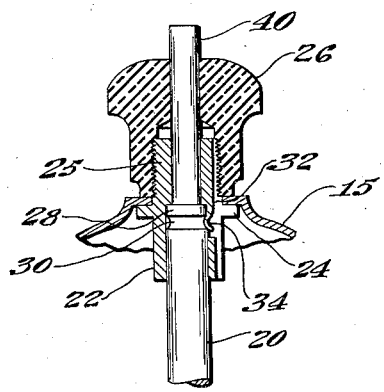
Figure 1:
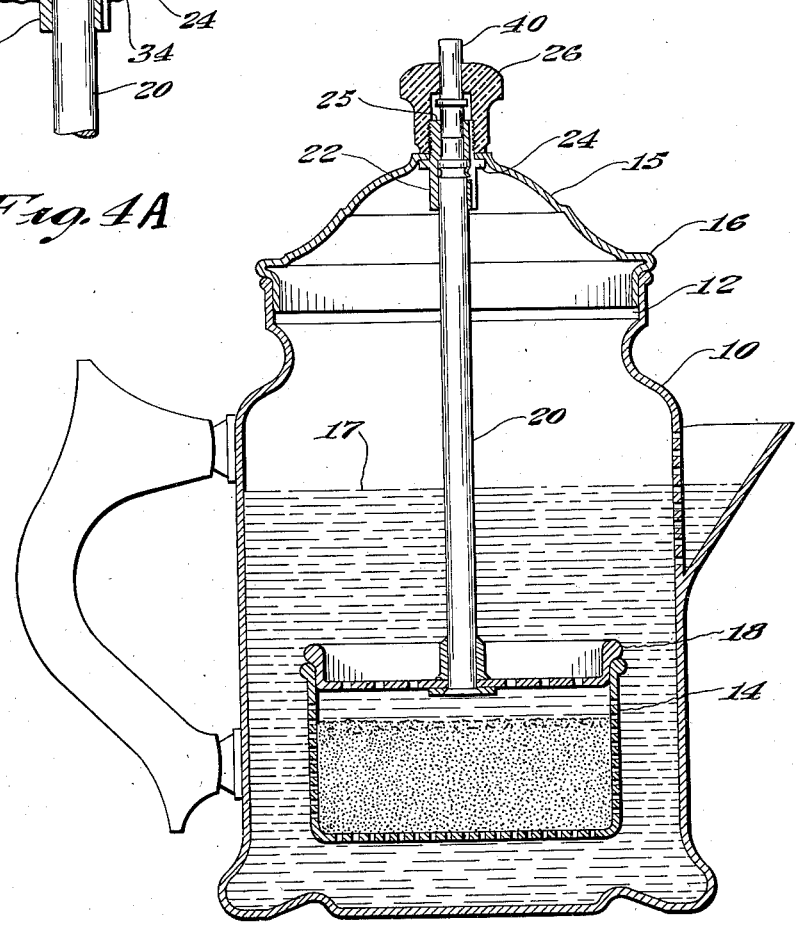

In the drawings illustrating the preferred embodiment of the invention, Fig. 1 is a vertical sectional view through the apparatus for making coffee; Fig. 2 is a perspective illustrating the manner in which the coffee grounds may be quickly removed from the coffee pot; and Figs. 3, 4 and 4A are details in section to be referred to.

In general, the present invention contemplates apparatus for making coffee comprising a container or pot which may take any usual or preferred form, having a relatively wide mouth or opening at the top thereof adapted to be closed by a removable cover. The ground coffee from which the coffee is to be produced is placed within a perforate container comprising preferably a perforate metal canister, and provision is made for operatively supporting the perforate container from the cover of the coffee pot in a manner such that when the cover is in its normal position the perforate container is suspended within the interior of the coffee pot near the bottom thereof in a position to be submerged beneath the normal water level therein. In the preferred form of the invention the perforate container is as above stated made of metal such as aluminum and provided with a removable cover to permit the ground coffee to be inserted therein and the spent coffee grounds to be subsequently removed therefrom. The cover member is provided with a rod adapted to project into a socket in the cover for the coffee pot, and provision is made for detachably securing the upper end of the rod in the socket to the end that after the coffee infusion has been made by boiling the water with the canister containing the ground coffee suspended therein, the coffee pot cover and perforate canister as a unit may be removed from the coffee pot in a rapid manner to avoid dripping from the coffee grounds into the coffee liquor and the canister and rod as a unit disposed upon a table or other convenient surface, and the detachment of the cover of the coffee pot from the rod and the subsequent replacement of the cover upon the coffee pot.

Referring now to the drawings, 10 represents the coffee pot which may be made of any suitable material such as aluminum, or glass, and which is provided with an opening 12 in its top of a width sufficient to permit the passage therethrough of a perforate container 14 for containing the ground coffee. The opening 12 is adapted to be closed by a cover 15 herein shown as of conventional form and provided with a rim 16 adapted to snugly fit into the mouth or opening 12 of the coffee pot.

Provision is made for operatively supporting the perforate container 14 from the cover member 15 in such manner as to dispose the container within the body of the coffee pot near the bottom thereof in a position to be submerged below the usual body of water 17 located therein. As herein shown, the container 14 for containing the ground coffee comprises a perforate metal container having a removable cover 18 which operatively supports a rod 20 of a length sufficient to extend into a socket member 22 within the cover 15. The socket member 22 is provided with a shoulder 24 and a threaded upper portion 25 and an insulating knob 26 screwed upon the threaded upper portion serves to retain the socket member in operative position in the cover. In order to detachably secure the upper end of the rod 20 in the socket member 22, as herein shown the rod is provided with a shoulder 28 and a recess 30, and a spring 32 formed in one wall of the socket member 22 is provided with a projecting portion 34 which is adapted to spring into the recess 30 below the shoulder 28 when the end of the rod is inserted into the socket. In order to detach the rod and the perforate container supported thereby from the cover member and socket, an insulating plunger 40 slidably received within the upper portion of the socket member 22 is caused to project into the dotted line position shown in Fig. 3 when the rod 20 is engaged within the socket, and may be depressed by the thumb in the manner illustrated in Fig. 2 to push the rod downwardly from the socket, enabling the perforate container and rod to be conveniently and easily disposed upon a table or other support 42 in the manner illustrated in Fig. 2, and enabling the cover to be returned to the coffee pot after the coffee has been made.

In Fig. 4A I have illustrated a modification of the invention, in which the rod 20 is made of sufficient length to extend upwardly through the knob 26. The upper part of the rod 20 thus serves as the plunger 40 to enable the rod and parts carried thereby to be detached from the cover in the manner above described.

From the description thus far it will be observed that the present apparatus for making coffee enables the coffee to be made in a most convenient and efficient manner. After the perforate container containing a supply of the ground coffee has been placed in operative position within the coffee pot and the water in the pot boiled for the desired length of time, then the operator may conveniently withdraw the perforate container and the rod from within the coffee pot, reducing to a minimum the amount of dripping from the coffee grounds and leaving the coffee liquor in the coffee pot of most pleasing taste and aroma, and avoiding the bitterness which is oftentimes produced by excessive boiling of the coffee grounds in contact with the liquor. After the unitary structure of the perforate container and rod is disposed upon the table or other support in the manner above described, the cover may be detached from the rod and returned to the coffee pot, enabling the coffee to be maintained in a heated condition until used.

While in the illustrated embodiment of the invention a separate insulated plunger is utilized for effecting the detachment of the rod from the socket, nevertheless it is not desired to limit the invention in this respect.

While the preferred embodiment of the present invention has been herein illustrated and described, it will be understood that the invention may be embodied in other forms within the scope of the following claims.

Having thus described the invention, what is claimed is:—

1. Apparatus for making coffee comprising a coffee pot provided with an open mouth at the top thereof of substantial width, a removable cover member for normally closing the mouth of the coffee pot, a perforate container adapted to hold the ground coffee and capable of insertion into the coffee pot through said mouth, a rigid member upon the lower end of which said perforate container is mounted, and a socket member in the cover into which the upper end of said rigid member is adapted to project to detachably secure the container to the cover member, and a heat insulating member cooperating with the rigid member for permitting force to be applied to the rigid member to disengage it from the socket, said rigid member being of a length sufficient to suspend the perforate container below the normal water level in the coffee pot when the rigid member is held in the socket member.

2. Apparatus for making coffee comprising a coffee pot having a mouth of substantial width, a detachable cover for closing the mouth of the coffee pot, a perforate container adapted to contain the ground coffee capable of insertion into the coffee pot through the mouth, a rod upstanding from and secured to the perforate container to form a unit therewith, a socket member in the coffee pot cover, said socket member having provision for detachably holding the upper end of the rod therein, and means separate from the rod and operable from the exterior of the cover member for effecting the disengagement of the upper end of said rod from the socket member, said rod being of a length sufficient to suspend the perforate container below the normal water level in the coffee pot when the rod is held in the socket member.

3. Apparatus for making coffee comprising a coffee pot having a mouth of substantial width, a detachable cover for closing the mouth of the coffee pot, a perforate container adapted to hold the ground coffee capable of insertion into the coffee pot through said mouth, a rod secured to the container to form a unit therewith and provided in its upper end portion with a recess, a socket member in the cover into which the upper end of said rod may be extended, said socket member being provided with a spring for engaging said recess to detachably hold the rod therein, and means separate from the rod adapted to effect the disengagement of the rod from said socket, said rod being of a length sufficient to suspend the perforate container below the normal water level in the coffee pot when the rod is held in the socket member.

4. Apparatus for making coffee comprising a coffee pot having a mouth of substantial width, a detachable cover for closing the mouth of the coffee pot, a perforate container adapted to hold the ground coffee capable of insertion into the coffee pot through said mouth, a rod secured to the container to form a unit therewith and adapted to be detachably secured to the cover to suspend the container in the lower portion of the interior of the coffee pot, and means for effecting disengagement of the rod from the cover including an insulating member adapted to project above the cover when the rod is secured to the cover, for engaging said rod to disengage it from said cover.

GEORGE F. SPALDING.